Figure 1:
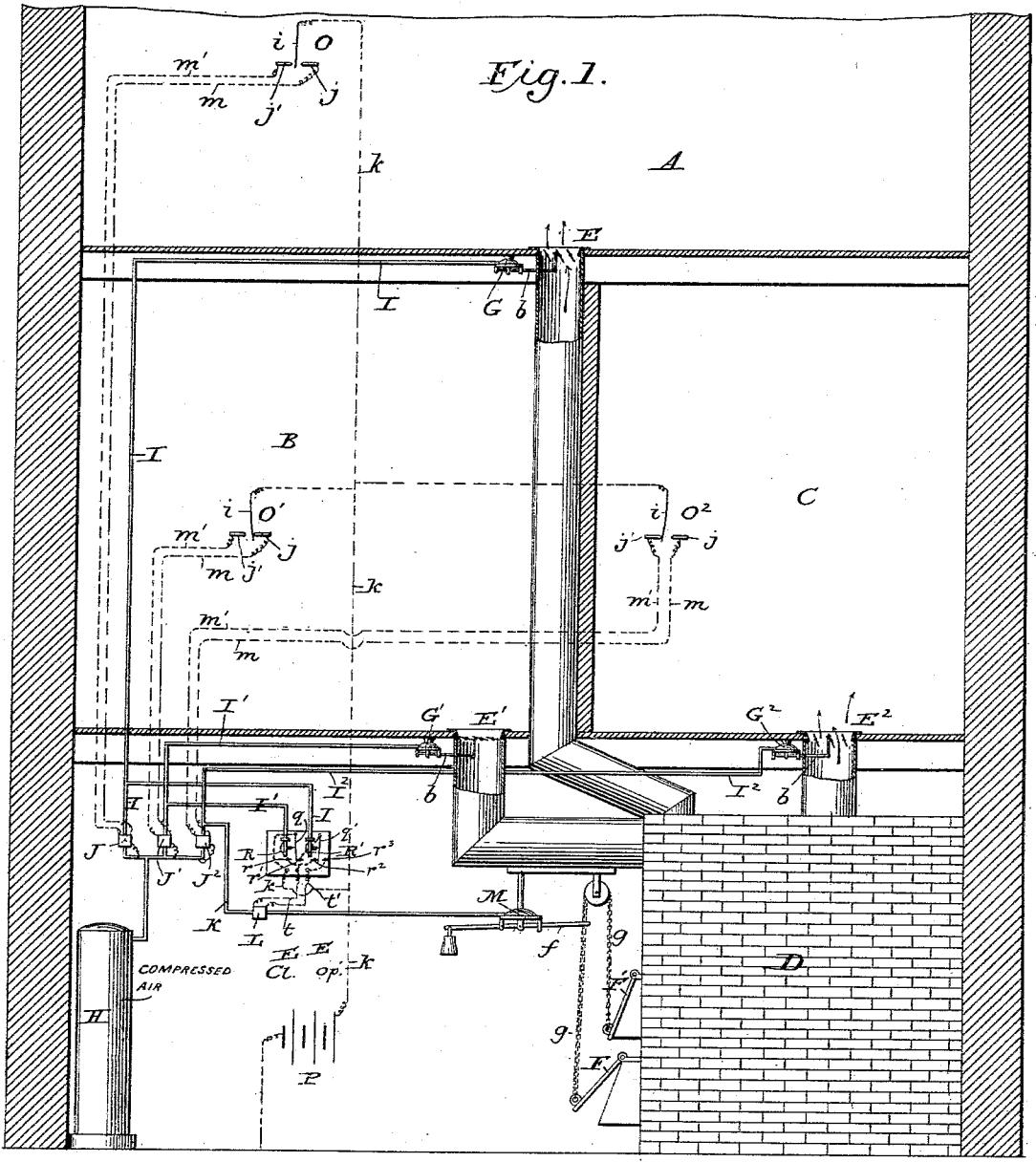

(No Model.) 4 Sheets—Sheet 1.

W. S. JOHNSON.
AUTOMATIC TEMPERATURE REGULATOR.

No. 378,137. Patented Feb. 21, 1888.

Attest:
Sidney P. Hollingsworth.
D. A. Kennedy.

Inventor:
W. S. Johnson.
By his Atty
P. T. Dodge.

(No Model.) 4 Sheets—Sheet 2.
W. S. JOHNSON.
AUTOMATIC TEMPERATURE REGULATOR.
No. 378,137. Patented Feb. 21, 1888.
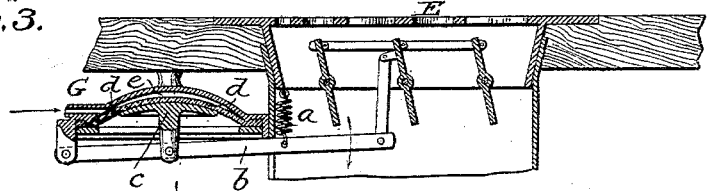
Fig. 3.
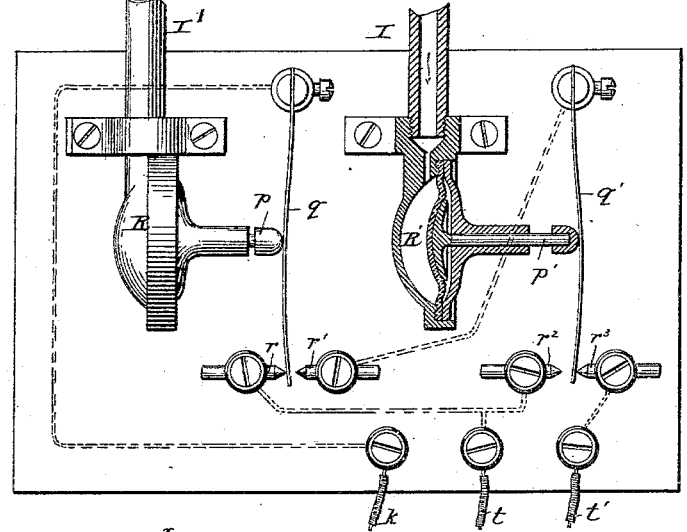
Fig. 4.
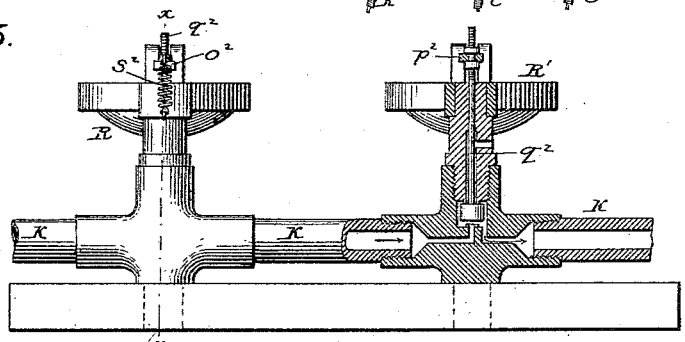
Fig. 5.
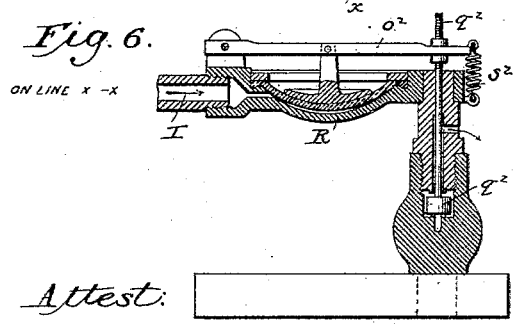
Fig. 6. ON LINE X—X
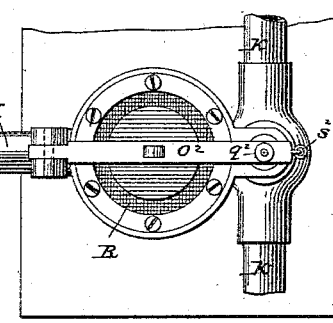
Fig. 7.
Attest:
Sidney P. Hollingsworth
W. R. Kennedy
Inventor.
W. S. Johnson
By his Atty.
P. T. Dodge (No Model.) 4 Sheets—Sheet 3.

W. S. JOHNSON.
AUTOMATIC TEMPERATURE REGULATOR.

No. 378,137. Patented Feb. 21, 1888.

Attest:
Sidney P. Hollingsworth
Kennedy

Inventor:
W. S. Johnson
By his Atty,
P. T. Dodge (No Model.) 4 Sheets—Sheet 4.
W. S. JOHNSON.
AUTOMATIC TEMPERATURE REGULATOR.
No. 378,137. Patented Feb. 21, 1888.
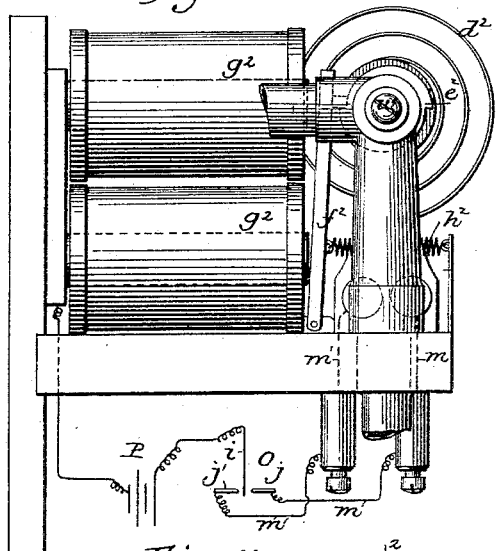
Fig. 12.
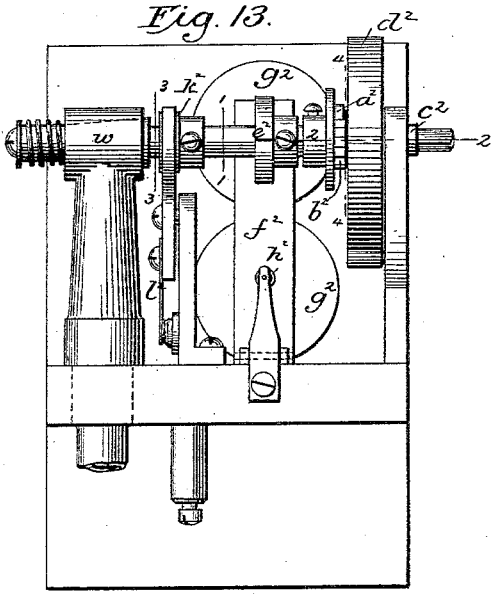
Fig. 13.
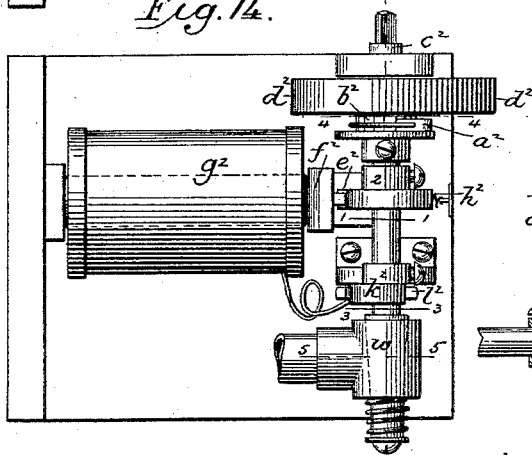
Fig. 14.
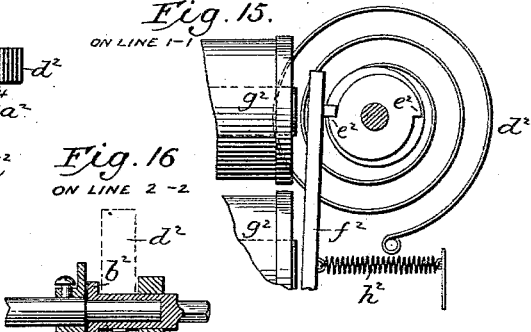
Fig. 15. ON LINE 1—1
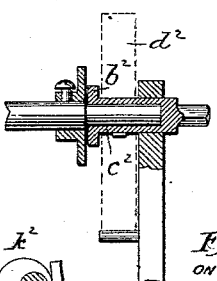
Fig. 16. ON LINE 2—2
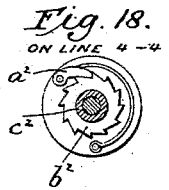
Fig. 18. ON LINE 4—4
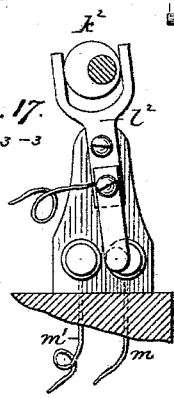
Fig. 17. ON LINE 3—3
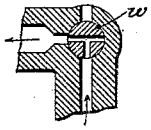
Fig. 19. ON LINE 5—5
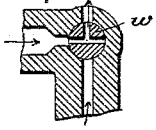
Fig. 20. ON LINE 5—5
Attest:
Sidney P. Hollingsworth
W. R. Kennedy
Inventor.
W. S. Johnson
By his Atty.
P. T. Dodge

UNITED STATES PATENT OFFICE.

WARREN S. JOHNSON, OF MILWAUKEE, WISCONSIN.

AUTOMATIC TEMPERATURE-REGULATOR.

SPECIFICATION forming part of Letters Patent No. 378,137, dated February 21, 1888.

Application filed April 9, 1887. Serial No. 234,214. (No model.)

*To all whom it may concern:*

Be it known that I, WARREN S. JOHNSON, of Milwaukee, in the county of Milwaukee and State of Wisconsin, have invented certain Improvements in Automatic Temperature-Regulators, of which the following is a specification.

In buildings of modern construction it is customary to heat a number of apartments by a single heating apparatus—such, for example, as a furnace with hot-air flues leading to the individual apartments, or a steam-boiler connected with radiators located in or adjacent to the apartments. Various automatic devices have been employed to shut the heat off from each apartment when the temperature therein exceeded the proper limit, and to check the action of the heater whenever the temperature in any one of the apartments became too high. Arrangements of this character are imperfect, in that they permit the heater to operate to its full capacity, notwithstanding the fact that one or all of the apartments may be closed against the admission of heat, and in that the action of the heater is frequently stopped by the rising temperature in one apartment, while the temperature in others is far below the required point.

Now, it is the aim of the present invention to provide an automatic system under which the temperature in each apartment is independently controlled and the action of the heater stopped only when the temperature in all the apartments has reached the required limit. Under my system an excess of temperature in any apartment is followed by a stoppage in the supply of heat thereto; but it is only when the temperature reaches the required point in all the apartments that the heater is stopped, and thus it is that the heater is enabled to continue its action so long as the temperature in any apartment of the service is below the predetermined limit.

In the most-highly developed form of my apparatus excessive temperature in any apartment is followed by the shutting off of the heat therefrom and by a corresponding reduction in the action or effect of the heater, so that the action of the heater and the amount of heat developed thereby are varied in accordance with the number of apartments or the amount of space to be heated.

My invention is susceptible of embodiment in various forms which will suggest themselves to persons skilled in the art; but I recommend for use under ordinary conditions the particular constructions represented in the accompanying drawings.

In the apparatus shown in the drawings a thermostat in each room controls an electric valve, which in turn admits fluid under pressure to an expansion-chamber or fluid-pressure device controlling the register through which the heated air enters the room, so that when the temperature rises to the proper limit the thermostat acts, through the intermediate devices, to stop the admission of hot air. The furnace-doors are connected with and controlled by a fluid-pressure device which receives its actuating-fluid through a valve or valves controlled indirectly by the joint action of the above-mentioned thermostats, so that the furnace-controlling valve is adjusted to stop the action of the furnace only when an excessive temperature in all the apartments causes the action of all the thermostats at one time. The fluid-pressure devices are, in fact, but motors to move the registers and the draft-regulator of the furnace; and it is to be understood that they may, like the devices used to move the valves, be replaced by any other suitable motors which will in the same combination answer the same purpose.

Figure 2:
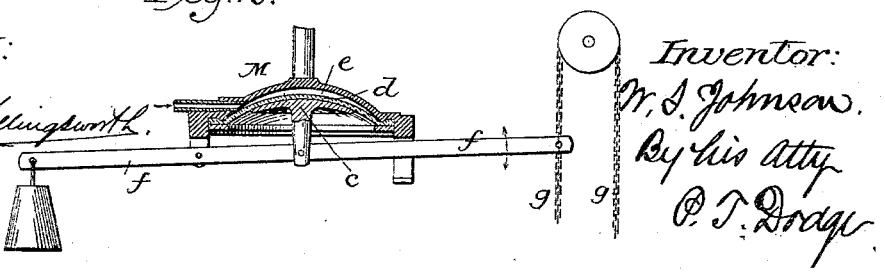
Figure 8:
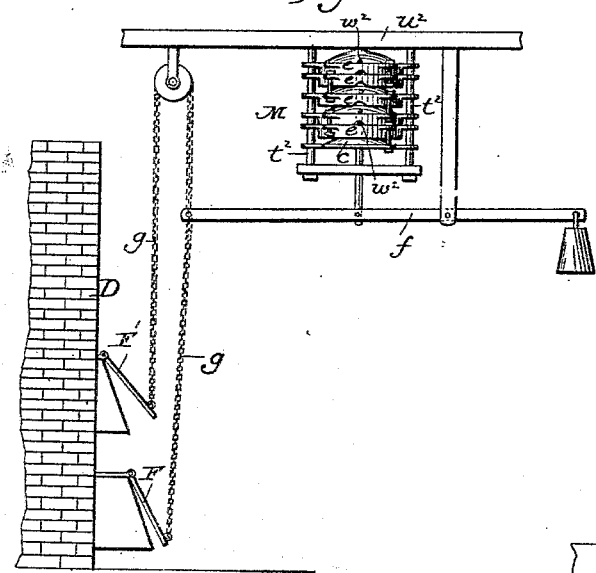
Figure 9:
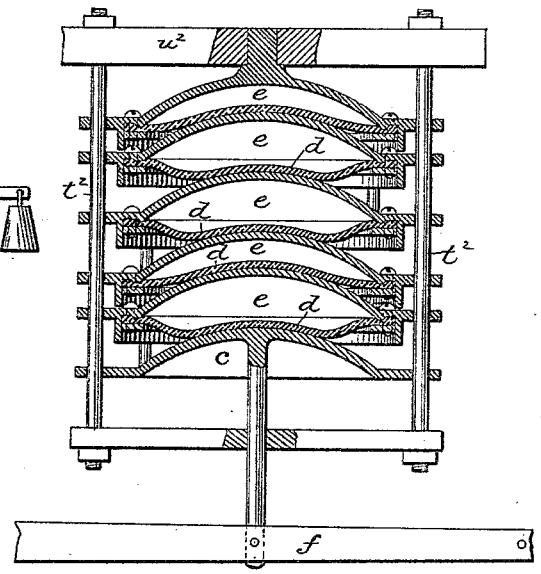
Figure 10:
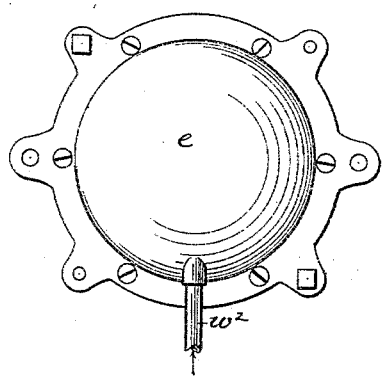
Figure 11:
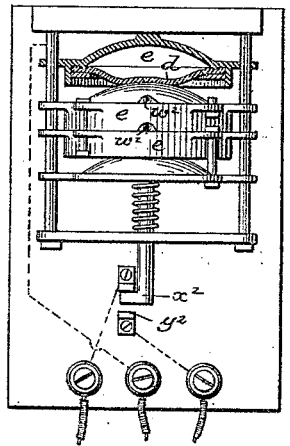

In the accompanying drawings, Figure 1 represents a sectional elevation of a portion of a building provided with a hot-air furnace and with the automatic temperature-regulating apparatus. Fig. 2 is a vertical section of the fluid-pressure device for controlling the action of the heater. Fig. 3 is a central cross-section of one of the fluid-pressure devices for controlling the admission of heat to the apartment. Fig. 4 is an elevation, partly in section, of the devices for obtaining the cumulative effect of the thermostats or regulators in the several apartments in controlling the heater. Fig. 5 is an elevation, partly in section, of another device for the same purpose. Fig. 6 is a vertical section on the line *x x* of Fig. 5. Fig. 7 is a top plan view of one of the expansion-chambers and valves embraced in the device shown in Figs. 5 and 6. Fig. 8 is a side elevation of a cumulative fluid-pressure device combined with the heater to vary its action according to the changing number of apartments which receive heat therefrom. Fig. 9 is a central cross-section of said device. Fig. 10 is a top plan view of the same. Fig. 11 is an elevation of a similar cumulative device to act indirectly and through electric circuits on the heater. Figs. 12, 13, and 14 are respectively a side, an end, and a plan view of an electrically-controlled valve which I prefer to use in my system. Figs. 15 to 20 are sections of the same on the lines thereon indicated.

Referring to Fig. 1, A, B, and C represent distinct rooms or apartments to be heated; D, a hot-air furnace connected by air-conducting flues with the apartments; E E' E², registers or valves controlling the admission of the heated air from the flues to the respective apartments; F, the draft-door of the furnace, the opening of which accelerates combustion, and F' a check-door, the opening of which retards combustion. All of the foregoing parts are of ordinary construction and arrangement.

To each of the registers E, E', &c., I connect a spring, $a$, by which it is opened, and a fluid-pressure device, G, by which it is closed. The closing device consists, as shown in Fig. 3, of a lever, $b$, connected at one end to the register and provided with an arm or plate, $c$, bearing against a flexible diaphragm, $d$, which forms a movable wall of an expansion-chamber, $e$, so that when a fluid—as air—is admitted under a suitable pressure into the chamber it will force the diaphragm downward and through the intermediate parts close the register and prevent the further admission of heated air to the apartments.

The expansion-chambers of the devices G, G', G², &c., are connected independently by pipes I I' I² with a reservoir, H, containing a constant supply of the fluid under pressure. The pipes are provided with electric valves J J' J², hereinafter described in detail, by which the delivery of the fluid through either pipe may be controlled independently, and thus the heat shut off from or admitted to either apartment without affecting the delivery to the others. The valves J, J', &c., are controlled, as hereinafter explained, by thermostats in the several apartments.

A pipe, K, provided with an electric valve, L, leads from the delivery side of valve J² to a fluid-pressure device, M, connected with the furnace-doors, so that when the two valves J² and L are open the fluid will pass from the receiver to the device M and check the action of the furnace. The pressure device M resembles those controlling the registers, and consists, as shown in Fig. 2, of a chamber, $e$, having one side formed by a yielding wall or diaphragm, $d$, which acts through a plate, $c$, on a lever, $f$, one end of which is weighted, while the other is attached to a chain, $g$, passing over an elevated pulley and attached at its extremities to the furnace-door. When the fluid enters the expansion-chamber, the weight is lifted, the upper door opened, and the lower door closed, thus checking combustion, and, on the other hand, when the fluid is permitted to escape the weight acts to open the draft-door and close the check-door, thus increasing the combustion.

The valve L, which controls the furnace, is connected electrically with the thermostats which control the registers in such manner that the valve can open and effect the stoppage of the furnace only when the temperature in all the apartments is up to the required limit and when all the registers are closed. As long as the temperature in any apartment is below the proper degree the valve L remains closed and the furnace continues its action.

In order that the action of the valves and their electrical connections may be understood, I will describe the parts first in detail and then in their relations to each other. The several electric valves may be of any construction which will admit of their being controlled electrically, so that when turned in one position they will deliver the fluid through and beyond them, and when turned in another position they will not only stop the further delivery of fluid, but permit that which has already passed to retreat and escape to waste after the manner of what are commonly known in the art as "three-way waste-valves."

O O' O² are thermostats located in the different apartments and serving to control the respective register-operating valves J J', &c. The thermostats, which are of ordinary construction, consist each of a compound metallic bar, $i$, fixed at one end and arranged at the opposite end to make contact with the conductor $j$ or $j'$, according as it is thrown to the right by an increase in temperature or the left by a decrease in temperature.

A battery, P, grounded on one side, is connected on the opposite side by a conductor, $k$, with the arms of all the thermostats. From the two conductors $j j'$ of each thermostat conductors $m m'$ are extended to opposite sides of the corresponding valves, J J', whence they are grounded through the pipes or otherwise. When, therefore, the temperature in any apartment becomes as high as desired, the arm $i$ closes the circuit through $j'$ and $m'$ to the valve, causing the latter to open and admit the fluid to the register-closing device G. When, on the contrary, the temperature descends, the thermostat opens the first circuit, and, closing the circuit through $j'$ to the opposite side of the valve, permits the fluid to retreat or escape from the register-closing device, so that the spring may open the register.

It will be perceived that the above actions have, as far as explained, no influence on the valve L or on the furnace, which latter continues its action. In order that the valve L may open and stop the furnace whenever the three valves J J' J² have opened to close the registers, I connect in the circuit which controls the valve L circuit-controlling devices which are actuated to close the circuit by air admitted through the valves J J', as illustrated in Figs. 1 and 4.

Two expansion-chambers, R R', are connected, respectively, with the pipes I and I', so as to receive the fluid pressure whenever the valves J J' are opened. The chamber R has its movable wall or diaphragm provided with an arm, $p$, acting against a conducting-finger, $q$, while the chamber R' acts in like manner upon a finger, $q'$. The finger $q$ vibrates between two conducting-points, $r$ and $r'$, standing normally in contact with the first, while the finger $q'$ vibrates in like manner between two conducting-points, $r^2$ and $r^3$, standing normally in contact with the first. The finger $q$ is connected permanently with the battery-wire $k$. The point $r'$ is connected permanently by a conducting-wire with the finger $q'$. The conducting-points $r$ and $r^2$ are permanently connected with a conductor, $t$, leading to one side of the valve L, and thence to the ground, for the purpose of closing the valve. The conducting-point $r^3$ is connected permanently to a conductor, $t'$, leading to the opposite side of the valve L, and thence to the ground, for the purpose of opening said valve. When the thermostats have opened both valves J and J', both chambers R and R' will be expanded, the finger $q$ forced into contact with the point $r'$, and the finger $q'$ forced into contact with the point $r^3$. The current will now pass from the battery-wire through $q$, $r'$, $q'$, $r^3$, and $t'$ to the valve L, and thence to the ground, causing the valve to open and admit air (if the valve J² has already been opened by its thermostat, and not otherwise) to the pressure device M, which acts to check the furnace. The above action can occur only when the temperature in all the rooms is up to the proper limit. If the temperature in either room is below the proper limit, its thermostat will act to close the corresponding valve, J, J', or J². If the valve J' is closed, the circuit controlling the main valve L will be broken at $r'$, and consequently the valve L will fail to open. If the valve J is closed, the circuit will be broken at $r^2$. If the valve J² is closed, it prevents the passage of the fluid into pipe K, and therefore prevents the operation of the furnace controlling device, although the valves J J' and L may all be open.

When the temperature in apartment A falls below the proper limit, its thermostat will close the valve J, whereupon the chamber R, being relieved of internal pressure, will permit the finger $q$ to make contact with the point $r$, thus breaking the circuit to the opening side of the valve L and completing the circuit through finger $q$, point $r$, and conductor $t$ to the closing side of the valve. A similar action will occur through chamber R' if the valve J' is closed by its thermostat.

It will be perceived from the foregoing that the circuit to open the valve L is completed only when the thermostats are actuated by an increasing temperature.

Referring now to the details of the valves hereinbefore alluded to, attention is directed to Figs. 12 to 20, in which $w$ represents the rotary valve-plug or valve proper, provided, as usual in three-way valves, with a port or passage diametrically through it from side to side and also with a side port at right angles thereto, so that when placed as in Fig. 19 it will permit the fluid to flow forward through the pipe; but when placed as in Fig. 20 will check the further advance and permit that which has previously passed to retreat and run to waste.

Fluid-receiving chambers with movable walls in the form of diaphragms and in the form of movable pistons are now well known in the art, and are used in many places for imparting motion to other devices. They are commonly known as "fluid-pressure devices," and to avoid repetition I have therefore adopted this name throughout the specification.

The valve-plug is expanded in the form of a shaft or spindle, which is provided at one end with a pawl, $a^2$, engaging a ratchet-wheel, $b^2$, on the end of a loose winding-collar, $c^2$, encircled by a coiled spring, $d^2$, which is attached at one end to the collar and at the opposite end to a fixed support, so that the spring tends, when wound, to revolve the plug and thus alternately open and close the valve. The spindle carries also a collar, with two shoulders, $e^2$, at diametrically-opposite points, to engage a stopping-lip on the armature $f^2$, located in the field of an electro-magnet, $g^2$, and drawn forward by a spring, $h^2$. The armature, engaging one or the other of the shoulders $e^2$, holds the valve at rest in its open or its closed position; but whenever the magnet is excited it attracts the armature and permits the valve-plug to make a half-revolution under the influence of its motive spring. Thus it is that at each action of the magnet the valve turns from the open to the closed or from the closed to the open position. In order to prevent the continuous action of the battery, I provide two conductors for connecting the same with opposite sides of the thermostat, and combine therewith an automatic switch, which breaks the connection with one conductor as soon as the valve is moved and establishes connection with the other conductor. These devices are shown in Figs. 12 to 17, in which $k^2$ is an eccentric carried by the valve-plug or spindle and working in the forked end of the pivoted switch or conductor $l^2$, which is connected with the battery-wire and arranged to make contact alternately with the terminal plates on the ends of the conductors $m$ and $m'$, leading to opposite sides of the thermostat.

I have selected for illustration the valve J. When the thermostat O closes the circuit at a high temperature, the current passes to the magnet through conductor $m$ and switch $l^2$, and the valve turns to the open position shown in Fig. 19, at the same time throwing the switch over to the conductor $m'$, thus breaking the circuit just employed and leaving the parts in position for the use of the other circuit when the thermostat closes it under a falling temperature.

While I have shown the particular connections incident to valve J, it is to be understood that like connections are made between the valves $J'$ and $J^2$ and their thermostat and between the valve L and its current-controlling devices.

Instead of actuating the furnace-controlling valve L electrically and through the medium of expansion-chambers R and R', I may apply these expansion-chambers, as shown in Figs. 5, 6, and 7, to operate directly upon valves upon the pipe K, so that fluid may pass to the device M when all the chambers are expanded, and not otherwise.

Referring to Figs. 5, 6, and 7, the expansion-chambers constructed and communicating with the delivery side of the valves J and $J'$, have their movable walls arranged to actuate levers $o^2$ and $p^2$, which in turn actuate the plugs or spindles $q^2$ of three-way or waste valves located on the pipe K. These valves are held normally shut by springs $s^2$. If the valves J $J'$ $J^2$ are all opened by a high temperature in the rooms with which they communicate, as before explained, both chambers R and R' will be expanded and both of the valves $q^2$ will be opened, so that fluid passing through the valve $J^2$ will flow thence through the pipe K, past both valves $q^2$ to the device M, and thus stop the action of the furnace. If, however, there is a low temperature in either room, the corresponding valve $q^2$ will remain closed and the passage of the fluid to the furnace-controlling device will be prevented. The valves $q^2$ are of the ordinary three-way or waste valve type before alluded to, so that when closed they permit the fluid which had previously passed to the device M to retreat therefrom.

The furnace-controlling device M in the form heretofore described embraced but a single expansion-chamber, and when this chamber was brought into action by the joint influence of the thermostats it caused the draft of the furnace to be wholly stopped. In order that the draft may be gradually increased or diminished according to the number of rooms receiving heat at the moment, I propose to construct the device M in the form shown in Figs. 8 and 9, with a series of expansion-chambers, each of which acts to partly check the draft, but all of which must be brought into action at one time to wholly stop the same.

As shown in Figs. 8 and 9, $e$ represents a series of expansion-chambers, each having one wall formed by a flexible diaphragm, $d$. These chambers are placed one on top of another, the movable wall of one resting against the rigid wall of the next, and are guided by side rods, $t^2$, on which they slide. The upper chambers of the series rest against a rigid top support, $u^2$, while the lower chamber rests against the plate $c$, acting upon the lever $f$, which is weighted and connected with furnace, as shown in Fig. 8, the arrangement being the same as that in Fig. 1.

The several chambers $e$ communicate by independent flexible pipes $w^2$ with the delivery side of the valves J $J'$, &c., so that whenever one of these valves is opened through its appropriate thermostat the fluid will flow not only to the register-closing device, but also through the pipe $w^2$, into one of the chambers $e$, expanding this chamber, which, acting through the chambers thereunder and forcing them downward, operates the lever $f$ and partly closes the draft, thus diminishing or lessening the action of the furnace, to compensate for the lessened demand thereon in consequence of the fact that communication with one of the rooms has been closed. The action of each thermostat in closing the register results in like manner in the expansion of one of the chambers $e$ and in a corresponding diminution of the draft, so that the furnace remains in action as long as it has any communication with any one or more of the compartments. The combustion is lessened in proportion to the number of rooms with which it is for the time being in communication. When all the thermostats are actuated by an increase of temperature, the chambers $e$ are all expanded, and, operating jointly, they carry the lever $f$ downward until it wholly closes the draft-door.

In Fig. 11 I have represented a compound expansion-chamber such as above described, arranged to operate an electric conductor, $x^2$, controlling a circuit for operating the valve L. The circuit remains open until all of the chambers are expanded, when the conductor will make contact with the plate $y^2$ and cause the operation of the valve L. When this device is used, the connection between its chambers with the air-supply will be identical with that described in connection with Figs. 8 and 9, and the arrangement of the circuits to the valve L may be identical with those described in connection with Figs. 1, 12, &c.

It will be perceived that the essence of my invention resides in combining thermostats in series with a heating apparatus through intermediate devices controlled by the joint action of the thermostats, as distinguished from an apparatus in which a series of thermostats are connected to and operate individually upon the heater; and it is to be noted that the intermediate devices through which the joint action of the thermostats is secured may be constructed in various forms, several of which, mechanical equivalents of each other, are illustrated and described in detail herein.

Having thus described my invention, what I claim is—

1. In combination with a series of apartments, a heating apparatus connected with said apartments, a draft-regulator for said heater, a series of thermostats located in the different apartments, and the intermediate connections, substantially as described, adapted to be operated by the joint action of the thermostats to control the draft-regulator, whereby the heater is automatically stopped when the temperature is raised to a predetermined limit in all the apartments, but not otherwise.

2. In combination with a series of apartments, each provided with a register or valve to control the admission of heat thereto, a furnace or heater communicating through said registers or valves with the respective apartments and provided with a draft-regulator, a series of thermostats mounted in the respective apartments and each controlling the register of its apartment, and the intermediate devices, substantially as described, connecting the thermostats in series with the draft-regulator, whereby they are adapted to co-operate in controlling said regulator.

3. In combination with a furnace or heater having a draft-door or damper, a fluid-pressure device to actuate said door, a valve controlling the delivery of fluid-pressure to said device, and a plurality of thermostats connected and arranged to operate jointly in controlling said valve, as described.

4. A series of rooms or apartments, a heater communicating with each of said rooms and provided with a draft-door or damper, and a register or valve controlling the admission of heat to each room, in combination with a fluid-pressure device and an electric-controlling valve connected with each register, a thermostat located in each room and controlling the valve which regulates the temperature of that room, a fluid-pressure device to actuate the draft-door of the heater, and intermediate connections, substantially as described, through which all the thermostats act jointly in controlling the pressure device of the draft-door, whereby the admission of heat to each room is independently controlled by its thermostat, but the action of the heater controlled by the united or cumulative action of thermostats in the different rooms.

5. In combination with the furnace having a draft-door or damper, the weighted lever tending to open said door, the fluid-pressure device to actuate the lever and close the door, an electric valve, L, controlling the delivery of fluid to said device, and a plurality of thermostats operating jointly to control said valve, whereby the thermostats are prevented from individually stopping the draft.

6. The registers, the fluid-pressure devices G G', &c., by which they are individually actuated, the valves J J' J², controlling the delivery of a fluid to said devices, the fluid-pressure device M, connected with and controlling the action of a heater or furnace, a pipe, K, through which fluid is received from valve J² and conducted to pressure device M, an auxiliary valve, L, in said pipe K, and connections, substantially as shown, whereby the valve L is permitted to open only when the valves J J' J² are all opened, as and for the purpose described.

7. In combination with the fluid-pressure device or expansion-chamber M, connected to and operating the draft-door of a furnace, the pipe K, connected therewith, the valves J J' J², through the last of which the pipe K is supplied, the electric valve L on the pipe K, the expansion-chambers R and R', receiving fluid through the valves J and J', respectively, electric circuits through which the valve L is controlled, and switches operated by the expansion-chambers R and R' and controlling said circuits, substantially as described, to open the valve L only when the valves J, J', and J² are all open, whereby the valves J, J', and J² are enabled to act jointly, but not individually, in effecting the stoppage of the furnace.

8. In combination with a valve operated thereby, a series of non-communicating expansion-chambers, e, placed side by side and acting one upon another, fluid-supply pipes leading to the respective chambers, and valves controlling the respective pipes, whereby one or more of the chambers may be expanded independently of the others.

9. In combination with the draft-door or damper of a furnace, a fluid-pressure device to control the same, consisting of a series of distinct expansion-chambers arranged to co-operate as described, and a series of thermostatically-operated valves through which fluid under pressure is admitted to the respective chambers, substantially as described.

In testimony whereof I hereunto set my hand, this 2d day of April, 1887, in the presence of two attesting witnesses.

WARREN S. JOHNSON.

Witnesses:
ALFRED MOVAWETZ,
ROBERT R. HOSKING.